(12) United States Patent
Spinelli et al.

(10) Patent No.: US 10,464,364 B1
(45) Date of Patent: Nov. 5, 2019

(54) SUBLIMATION TRANSFER PAPER WITH COATING, AND METHOD FOR MAKING SAME

(71) Applicant: SpectraJet, Woodstock, IL (US)

(72) Inventors: Guy James Spinelli, Woodstock, IL (US); Paul Herbert DeWyngaert, Glovcaster, MA (US)

(73) Assignee: Spectrajet, Woodstock, IL (US)

( * ) Notice: Subject to any disclaimer, the term of this patent is extended or adjusted under 35 U.S.C. 154(b) by 0 days.

(21) Appl. No.: 15/646,981

(22) Filed: Jul. 11, 2017

Related U.S. Application Data

(60) Provisional application No. 62/360,827, filed on Jul. 11, 2016.

(51) Int. Cl.
| | |
|---|---|
| *B41M 5/50* | (2006.01) |
| *B41M 5/52* | (2006.01) |
| *B41M 5/382* | (2006.01) |
| *C09D 5/14* | (2006.01) |
| *C09D 129/04* | (2006.01) |
| *C09D 103/02* | (2006.01) |
| *C09D 7/65* | (2018.01) |
| *C09D 7/63* | (2018.01) |
| *C09D 7/61* | (2018.01) |

(52) U.S. Cl.
CPC ........ *B41M 5/502* (2013.01); *B41M 5/38228* (2013.01); *B41M 5/5236* (2013.01); *B41M 5/5254* (2013.01); *C09D 5/14* (2013.01); *C09D 7/61* (2018.01); *C09D 7/63* (2018.01); *C09D 7/65* (2018.01); *C09D 103/02* (2013.01); *C09D 129/04* (2013.01)

(58) Field of Classification Search
CPC .... B41M 3/382; B41M 3/38228; B41M 5/50; B41M 5/502; B41M 5/5236; B41M 5/5254; B41M 2205/02
USPC .......................................... 503/227; 427/146
See application file for complete search history.

(56) References Cited

U.S. PATENT DOCUMENTS

| | | | |
|---|---|---|---|
| 6,902,779 | B1 | 6/2005 | de Visser et al. |
| 6,966,972 | B2 | 11/2005 | Trochlil et al. |
| 7,341,768 | B2 | 3/2008 | de Visser et al. |
| 7,662,451 | B2 | 2/2010 | de Visser et al. |
| 8,082,877 | B2 | 12/2011 | Frob et al. |
| 2011/0069107 | A1 | 3/2011 | DeWyngaert, III |
| 2014/0109324 | A1 | 4/2014 | Rasmussen |

*Primary Examiner* — Gerard Higgins
(74) *Attorney, Agent, or Firm* — Dunlap Codding, P.C.

(57) ABSTRACT

A novel sublimation transfer paper is disclosed that incorporates a disclosed sublimation coating via a disclosed process for manufacturing the novel sublimation transfer paper. The novel sublimation transfer paper allows for consistent blooms for the sublimation inks, which leads to consistency of color. The novel sublimation paper also exhibits less cockling, which allows print heads to be closer to the novel sublimation transfer paper leading to the possibility of better print detail and the consumption of less ink. The novel sublimation transfer paper disclosed can be printed using sublimation dispersible inks having a water, oil, or solvent base with the substantially the same resulting color quality regardless of the ink base utilized.

8 Claims, 4 Drawing Sheets

SUBLIMATION TRANSFER PAPER WITH COATING, AND METHOD FOR MAKING SAME

The present patent application claims priority under 35 U.S.C. 119(e) to the provisional patent application identified by U.S. Ser. No. 62/360,827, filed on Jul. 11, 2016, which is hereby incorporated by reference.

FIELD OF THE INVENTION

The present disclosure generally relates to sublimation transfer paper with coatings, the coatings, and the methods of making the sublimation transfer paper with coatings and the coatings.

BACKGROUND OF THE DISCLOSURE

As background, transfer paper is generally used in applying graphics to textiles, ceramics, plastics, and various arts and crafts projects. A printer is first used to print an image on paper, and then a heat press can is used to vaporize the image onto the textiles, ceramics, plastics, and other types of surfaces. That's why it is called "transfer paper," it is used in creating transfers. There are various ways to print transfer paper including, inkjet printing, dye sublimation, color laser, rotogravure printing, and offset printing.

Important to the current application, dye-sublimation printing is a digital printing technology using full color artwork that generally works with various substrates, including polyester and polymer-coated substrates. The process is commonly used for decorating apparel, signs and banners, as well as novelty items such as cell phone covers, plaques, coffee mugs, and other items with sublimation-friendly surfaces. The process involves sublimation, in which heat and pressure are applied to a solid (in this instance the sublimation dyes), turning it into a gas through an endothermic reaction without passing through the liquid phase.

In sublimation printing, unique sublimation dyes are may be transferred to sheets of sublimation transfer paper, for example, by a liquid gel ink generally through a piezoelectric print head. The ink is deposited on these high-release inkjet transfer papers, which are used for the next step of the sublimation printing process. After the digital design is printed onto sublimation transfer sheets, it is placed on a heat press along with the substrate (banner, cell phone cover, coffee mug, etc.) to be sublimated.

The transfer of the image from the transfer paper to the substrate requires a heat press process that is a combination of time, temperature and pressure. The heat press applies this special combination, which can change depending on the substrate, to "transfer" the sublimation dyes found on the transfer paper at the molecular level into the substrate. The most common dyes used for sublimation activate at 350 degrees Fahrenheit. However, a range of 380 to 420 degrees Fahrenheit is normally recommended for optimal color.

The end result of the sublimation process is a nearly permanent, high resolution, full color print. Because the dyes are infused into the substrate at the molecular level, rather than applied at a topical level (such as with screen printing and direct to garment printing), the prints will not crack, fade or peel from the substrate under normal conditions.

Sublimation transfer paper is an important part of the sublimation process. Thus, the quality and characteristics of that paper is also important. Currently, sublimation transfer paper is specific to the type of ink systems that would be used to print the sublimation dyes. In other words, different types of sublimation transfer paper were needed for use with water, oil, and solvent based ink systems to obtain desirable results. Thus, if a printer used all three ink systems, it also needed three different types of sublimation transfer paper, which was inconvenient for many reasons, including the need and expense to stock the separate papers, and the time necessary to change between paper-types.

Another disadvantage with current sublimation transfer papers is that the sublimation coatings are only applied to the top of the paper after the paper is created. This causes inconsistent blooms for the sublimation inks, which leads to inconsistency of color. Also, when sublimation coatings are applied to the top of the paper after the paper is created, it causes an increase in cockling to the paper, which increases the distance that the print head needs to be from the paper, which lessens the detail in the print.

The present invention seeks to solve the prior shortcomings of sublimation transfer paper and their coatings. The present invention discloses a new and novel dye sublimation transfer paper and process of making that paper. The present invention is the first digital sublimation transfer paper that can be printed on with sublimation dispersible base inks, having a water base, oil base, and a solvent base. The same color quality is achieved regardless of the ink base utilized. Therefore, there is no need to use alternative types of paper for alternative types of ink.

As noted above a major shortcoming of the existing sublimation transfer paper is that the coatings are applied after the paper formation is complete, generally as a wet laminate coating to the top of an already existing sheet. The present invention overcomes this shortcoming by applying the coating as part of the paper manufacturing process. As a result, the coating is integrated or married into the paper. This marrying of paper and coating has at least two major benefits. First, it causes consistent blooms for the sublimation inks, which leads to consistency of color. Second, the integration of the coating into the paper causes less cockling of the paper which allows the print head on the printer to be closer to the paper, thus, allowing better detail in the print. Both of these benefits should also lead to the use of at least 25% less printer ink. These benefits allow for a new and very unique sheet that will not only provide extremely bright, saturated colors, but also outstanding detail with reduced ink loads. This new paper allows the dye to become part of the coating, yet keeps it from swelling, which improves resolution in the transfer. The resulting paper is also humidity stable and fast-drying.

SUMMARY OF THE DISCLOSURE

In one aspect, a process of making a new and novel sublimation transfer paper is disclosed. The method involves a paper manufacturing process which uses a paper machine to create paper which is coated on a first and second side comprising mixing a fiber/water mixture in a head box, suctioning excess water by passing the fiber/water mixture through wire, absorbing excess water by passing the fiber/water mixture through felt which results in paper, and drying the paper through a first dryer section, wherein the paper is dried using a steam temperature ranging from 89 degrees Fahrenheit to 500 degrees Fahrenheit, and wherein the paper has a minimum of about 80% fiber/20% water to a maximum of about 92% fiber/8% water, applying a first coating to a first side of the paper using a first coater on the first coating section of the paper machine, drying the paper through a second dryer section, wherein the paper is dried using a steam temperature ranging from 89 degrees Fahrenheit to 500 degrees Fahrenheit, applying a second coating to a second side of the paper using a second coater on the second coating section of the paper machine, and drying the paper through a third dryer section, wherein the paper is dried using a steam temperature ranging from 89 degrees Fahrenheit to 500 degrees Fahrenheit.

In another aspect, a sublimation transfer paper is disclosed, which comprises of a paper substrate having a first side containing a first coating, wherein the first coating is a first mixture comprising of one or more components, and at least one of the components in the first mixture is a second mixture, and a second side containing at least a second coating, and wherein the first coating and the second coating are added to the paper during the paper manufacturing process.

In another aspect, a method of creating a coating for a sublimation transfer paper is disclosed. The method for making a sublimation transfer paper coating comprises preparing a second mixture having one or more components, heating the second mixture to a temperature of about 190 degrees Fahrenheit, holding the second mixture at a temperature of about 190 degrees Fahrenheit for about 30 minutes, draining the second mixture to remove crystal solids, cooling the second mixture to temperature of about 160 degrees Fahrenheit, maintaining the temperature of the second mixture at a temperature of about 160 degrees Fahrenheit, and preparing a first mixture having one or more components, wherein one of the components is the second mixture, and wherein the second mixture has temperature of about 160 degrees Fahrenheit when it is combined with the first mixture.

In a further aspect, a coating for sublimation transfer paper is disclosed. The coating comprises a first mixture comprising of one or more components, wherein at least one of the components in the first mixture is a second mixture, and wherein the second mixture is at a temperature of about 160 degrees Fahrenheit when combined with the first mixture.

DETAILED DESCRIPTION

Figure 1:
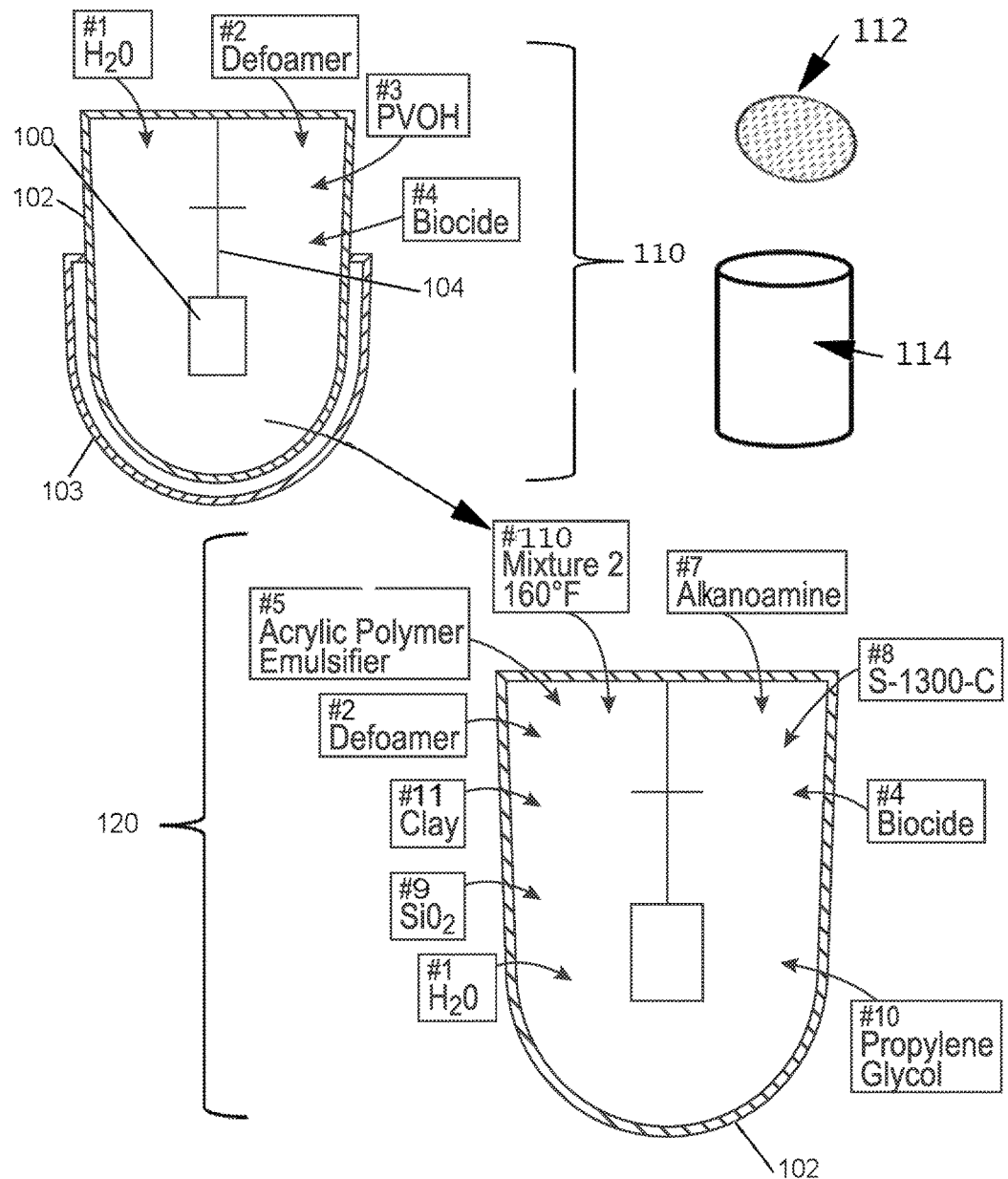
FIG. 1 of the drawings is a schematic illustration of a novel process of making a coating for sublimation transfer paper.

Before explaining at least one embodiment of the presently disclosed and claimed inventive concepts in detail, it is to be understood that the presently disclosed and claimed inventive concepts are not limited in their application to the details of construction, experiments, exemplary data, and/or the arrangement of the components set forth in the following description or illustrated in the drawings. The presently disclosed and claimed inventive concepts are capable of other embodiments or of being practiced or carried out in various ways. Also, it is to be understood that the phraseology and terminology employed herein is for purpose of description and should not be regarded as limiting.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, certain well-known features may not be described in detail to avoid unnecessarily complicating the instant disclosure.

Generally, sublimation transfer paper is used for the process of dye-sublimation printing which allows graphics and images to be placed on substrates that are traditionally difficult for traditional forms of printing. This invention generally discloses sublimation transfer paper which incorporates a coating into the paper during the paper manufacturing process. The coating integrated sublimation transfer paper allows for consistent blooms for the sublimation inks, which leads to consistency of color, it has less cockling which allows the print head on the printer to be closer to the paper, and which leads to better detail in the print, and it uses at least 25% less printer ink. The disclosed sublimation transfer paper is also the first digital sublimation transfer paper that can be printed using sublimation dispersible base inks, having a water base, oil base, and a solvent base, and has the same color quality regardless of the ink base utilized.

As used herein, the terms first, second, third, and the like are used to distinguish between similar elements and not necessarily for describing a specific sequential or chronological order. The terms are interchangeable under appropriate circumstances and the embodiments of the invention can operate in other sequences than described or illustrated herein.

In addition, the terms top, bottom, front, rear, left, right, upper, lower, and the like as used herein are used for descriptive purposes and not necessarily for describing specific positions. The terms so used are interchangeable under appropriate circumstances and the embodiments described herein can operate in orientations other than described or illustrated herein.

As used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

The term "and combinations thereof" as used herein refers to all permutations or combinations of the listed items preceding the term. For example, "A, B, C, and combinations thereof" is intended to include at least one of: A, B, C, AB, AC, BC, or ABC, and if order is important in a particular context, also BA, CA, CB, CBA, BCA, ACB, BAC, or CAB.

Continuing with this example, expressly included are combinations that contain repeats of one or more item or term, such as BB, AAA, AAB, BBC, AAABCCCC, CBBAAA, CABABB, and so forth. A person of ordinary skill in the art will understand that typically there is no limit on the number of items or terms in any combination, unless otherwise apparent from the context.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

The use of the terms "at least one" and "one or more" will be understood to include one as well as any quantity more than one, including but not limited to each of, 2, 3, 4, 5, 10, 15, 20, 30, 40, 50, 100, and all integers and fractions, if applicable, therebetween. The terms "at least one" and "one or more" may extend up to 100 or 1000 or more, depending on the term to which it is attached; in addition, the quantities of 100/1000 are not to be considered limiting, as higher limits may also produce satisfactory results.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
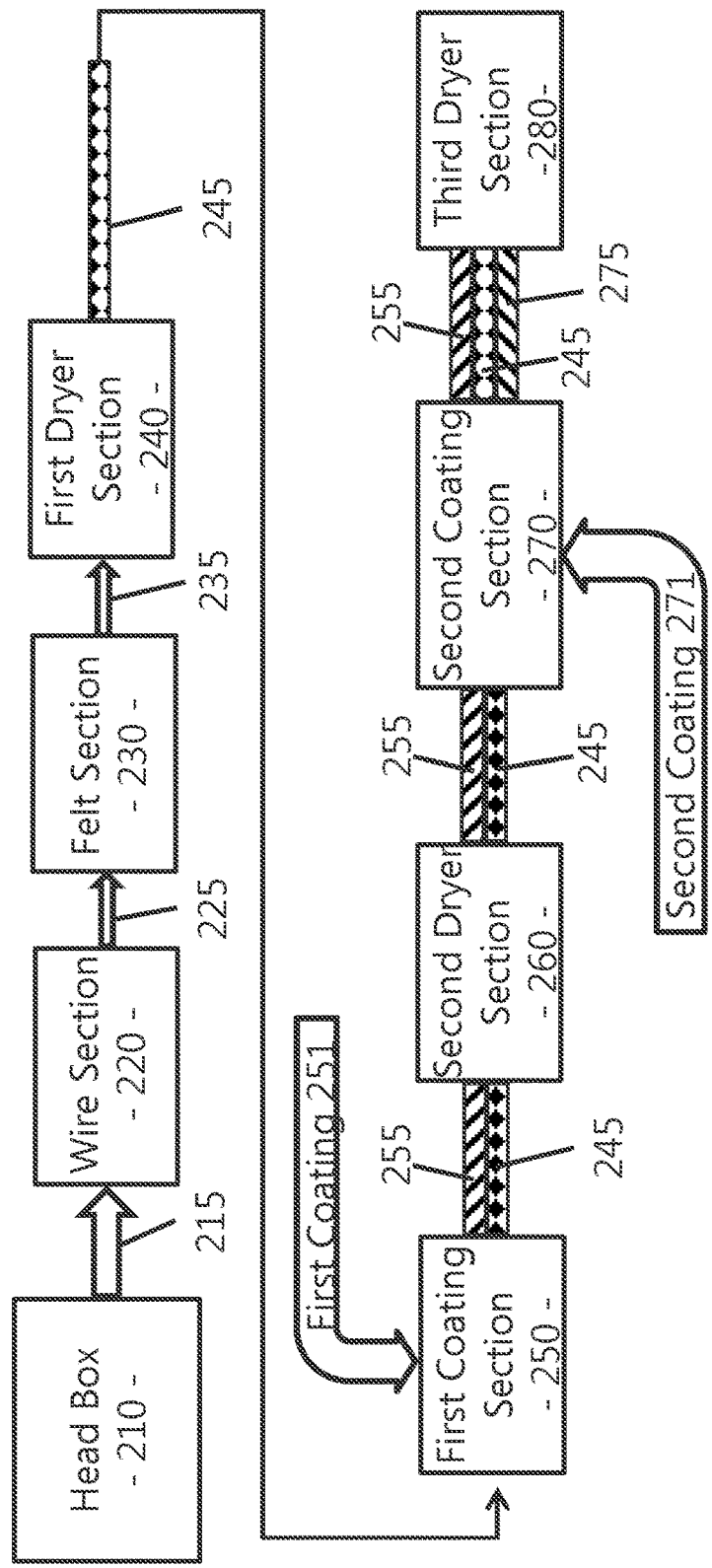
FIG. 2 of the drawings is a schematic drawing of a novel process of making sublimation transfer paper.

One embodiment of a method of producing a sublimation transfer paper during a paper manufacturing process is disclosed. The paper is preferably made on a paper machine, such as one manufactured by Valmet (Espoo, Finland); however, there are various paper machines manufactured by various companies which are available and that have the same capabilities as a Valmet. The paper machine may have a width of the wire of about 45 to 350 inches. A paper machine is shown in FIG. 2, which includes the four sections generally found in traditional paper machines: the head box (210), the wire section (220), the felt section (230), and the first dryer section (240). As with prior papermaking methods, the process starts at the head box (210) of the paper machine. In the head box (210) fiber and water is combined. In the present approach, the combination is intended to be a ratio of between about 98% water/2% fiber and 8% fiber/92% water. In general, the fiber/water ratio may be measured throughout the paper manufacturing process by solid or moisture meters, which may be incorporated in various locations throughout the paper machine. The resultant fiber/water mixture (215), sometimes referred to as stock slurry or white water, is disbursed from the head box (210) through an opening, often referred to as a port, onto a wire (220) made of copper or Teflon at a rate of about 1700 feet per minute to 6000 feet per minute. The fiber/water mixture (215) is moved through the wire (220) section by rollers, as was previously known in the papermaking art. The preferred roller speed for the present process throughout the paper machine is about 2700 ft/min to 4000 ft/min. The wire (220) suctions the water from the fiber/water mixture (215), which results in an increase in fiber/water ratio. In an illustrative example, as the fiber/water mixture (215) moves along the wire (220) the ratio changes from about 89% water/11% fiber near the head box (210) to about 55% water/45% fiber at the end of the wire (220). Thus, the wire section (220) is the part of the paper machine where the first paper (225) is formed. From the wire section (220), the fiber/water mixture, i.e. first paper (225) moves into and through the felt (230) section being urged along by rollers. The felt section (230) further removes water content in the paper (225) by absorbing the water and decreasing the fiber/water ratio to the range of about 40% water/60% fiber to about 25% water/75% fiber. Then, the fiber/water mixture, i.e. second paper (235) moves through the dryer section of the paper machine via rollers. The novel paper making machine disclosed herein contains more than one dryer section unlike other paper machines. The first dryer section (240) preferably comprises dryer canisters which produce and dry with steam at a temperature range of about 89 degrees Fahrenheit to about 500 degrees Fahrenheit. The dryer canisters dry the second paper (235) until the fiber/water ratio is minimum of about 80% fiber/20% water to a maximum of 92% fiber/8% water. Within this application we refer to this outcome as the paper (245). The first dryer section (240) may contain 1 to 30 dryer canisters. After the paper (245) has moved out the first dryer section (240), it moves to a first coating section (250) where a first coating (251) is applied to a first side of the paper (245), which is often times referred to as the felt side of the paper, at about 2 to 10 pounds. Preferably, the first coating 251 comprises the first mixture 120, which is made in accordance with a later disclosure in this application. The first coating (251) is applied with a first coater in the first coating section (250). That first coater may be coating rods, doctor blades, or waterfall technology. Generally, coating rods are rods with grooves varying in size. The wider the grooves of the coating rods, the more coating that goes on the paper. Blade coating, or using doctor blades, involves putting the paper into a coating pan, and then using a steel blade to remove the excessive coating. Waterfall technology coating is similar to doctor blades, except the coating flows like a waterfall into coating pan containing the paper, and the excessive coating is removed with a plastic straight edge. The first coating (251) is preferably at a temperature of about 75 to 105 degrees Fahrenheit when it is being applied to the paper (245). After the first coating (251) is applied to a first side of the paper, the resulting paper (245) and first coating layer (255) combination is dried by a second dryer section (260). Similar to the first dryer section (250), the second dryer section (260) may have 1 to 30 dryer canisters which produce and dry with steam at a temperature range of about 89 degrees Fahrenheit to about 500 degrees Fahrenheit. The temperature selected for the drying steps need not be the same or even similar. The dryer canisters dry the paper (245) and first coating layer (255) until the fiber/water ratio is about 89% fiber/11% water. For clarification purposes, the fiber/water ratio does not include any other component that would not be a portion of the fiber or water; thus, the coating chemicals are not accounted for in the fiber/water ratio because those chemicals do not absorb or release water. The final measurement of the first coating (251) in the sublimation transfer paper (i.e. the combination of 245/255) should be preferably about 5% coat weight, but there has to be at least 2% coat weight, and never more than 10% coat weight. Generally, the total percentage weight of coating is measured mechanically using a micron microscope in a 2 inch×2 inch portion of the total paper (including the first coating (251)). Percentage measurements are taken at every 4 inches of an 18 inches sample of each reel of paper that it produced. After the first side of the sublimation transfer paper (245/255) is adequately dry, the sublimation transfer paper (245/255) moves to a second coating section (270) where a second coating (271), preferably starch, is applied to the second side of the paper (245) at about ½ to 8 pounds of 2% starch. The second side of the paper (245) is often times referred to as the wire side of the paper. The second coating (271) is applied with a second coater in the second coating section (270). That second coater may also be coating rods, doctor blades, or waterfall technology. The preferred temperature of the second coating (271) is also about 75 to 105 degrees Fahrenheit when it is being applied to the sublimation transfer paper (245/255). The purpose of the second coating (271) (i.e. starch) is to stabilize the sheet for printing, and to prevent buckling of the paper. As an alternative to starch or some other coating, the second coating (271) may also be the same coating as the first coating (251). Finally, the sublimation transfer paper, which may now include the first coating layer (255), and second coating layer (275) and the paper (245) is dried as it moves through a third dryer section (280) which may have 1 to 30 dryer canisters which produce and dry with steam at a temperature range of about 89 degrees Fahrenheit to about 500 degrees Fahrenheit. The dryer canisters dry the paper until the fiber/water ratio is about 94% fiber/6% water. At this point the dried paper (245) is spooled. As an alternative to the drying canisters, the first, second and/or third dryer sections may contain Yankee dryers.

The paper (245) is preferably an uncoated free sheet, which is paper without ground wood (i.e. free of bark); however, the paper can contain up to 100% recycled fiber. Once the first coating (251) and second coating (271) are applied to the paper (245) through the paper manufacturing process, it is referred to as sublimation transfer paper.

As used herein, and as shown in FIG. 2, the layers of the sublimation transfer paper (245/255/275) are only illustrative, and are not intended to reflect the actual existence (or absence) of any physical layers. The first coating (251) and the second coating (271) may both be physically integrated into the paper layer (245). Alternatively, the first coating (251) may be physically integrated into the paper layer (245), and the second coating (271) may be a physical layer. Alternatively, the first coating (251) and the second coating (271) may both be physical layers on the paper layer. It is also envisioned that other coating alternatives may also be possible within the scope of the present invention. However, regardless of the physical integration (or lack of such physical integration) of the coatings, in a preferred and illustrative embodiment of the invention as shown in FIGS. 2 and 3, the first coating (251) and the second coating (271) are applied during the manufacturing process as described herein.

Figure 3:
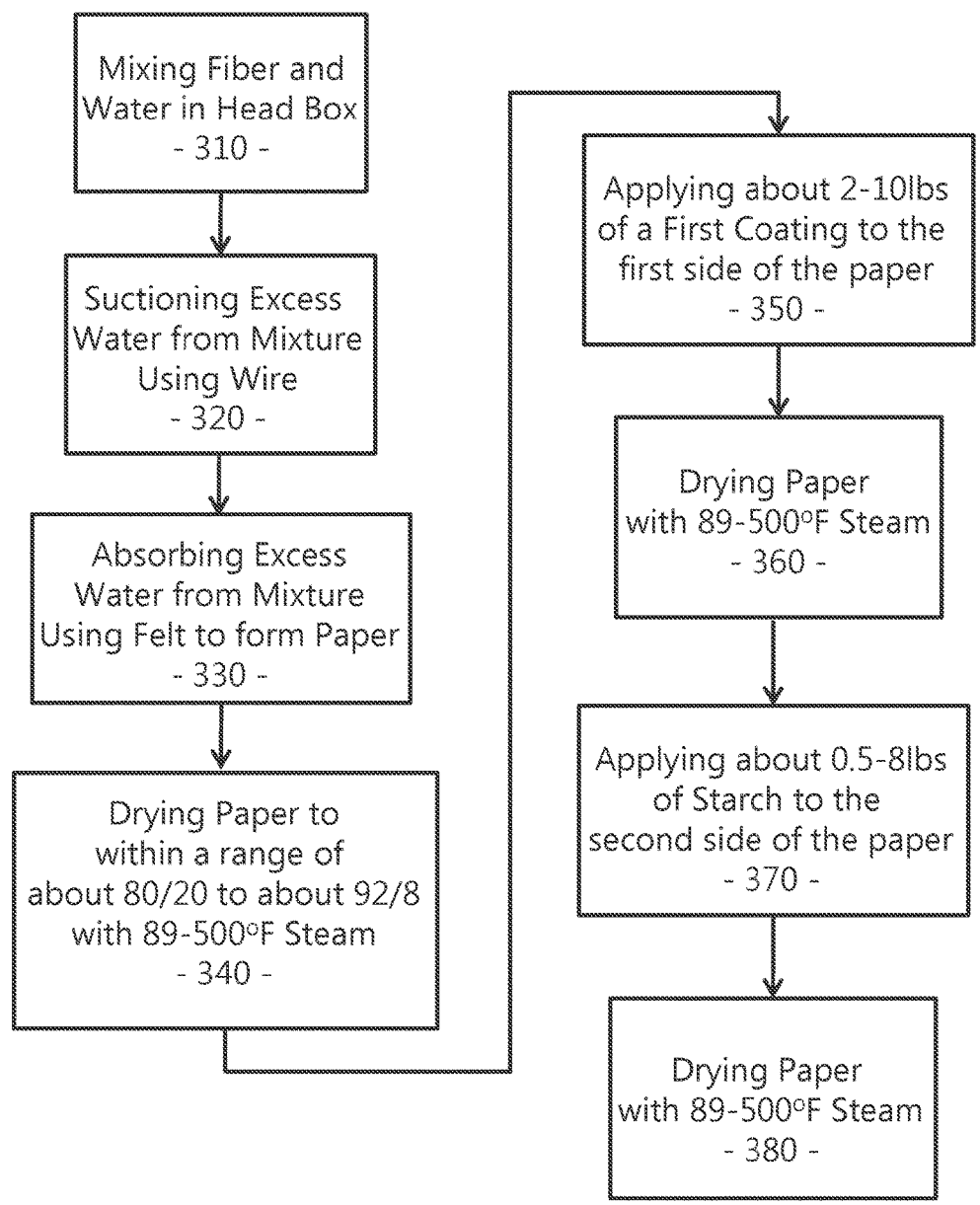
FIG. 3 of the drawings is a flow diagram of a novel process for making sublimation transfer paper.

Thus, more specifically, as illustrated by FIGS. 2 and 3, together, the sublimation transfer paper is made by first mixing a fiber/water mixture in a head box (210) (process block 310 (FIG. 3)). Then, suctioning is used to remove the excess water from the fiber/water mixture (215) by passing the fiber/water mixture (215) through wire section 220 (see, process block 320). Next, the excess water is absorbed from the fiber/water mixture (i.e. first paper (225)) by passing the fiber/water mixture (i.e. first paper (225)) through felt section 230 resulting in paper (i.e. second paper (235)) (see, process block 330). Next, the paper (i.e. second paper (235)) is dried through a first dryer section 240, wherein the paper (i.e. second paper (235)) is dried using a steam temperature ranging from about 89 degrees Fahrenheit to about 500 degrees Fahrenheit, and wherein the paper (i.e. paper (245)) has a minimum of about 80% fiber/20% water to a maximum of about 92% fiber/8% water (see, process block 340). Next, a first coating (251) is applied to a first side of the paper (245) in the first coating section 250 of the paper machine (see, process block 350). Next, the paper (245) is dried through a second dryer section 260, wherein the paper (245) is dried using a steam temperature ranging from about 89 degrees Fahrenheit to about 500 degrees Fahrenheit (see, process block 360). Next, a second coating (271) is applied to a second side of the paper (245) in the second coating section 270 of the paper machine (see, process block 370). Finally, the paper (245) is dried through a third dryer section 280, wherein the paper (245) is dried using a steam temperature ranging from about 89 degrees Fahrenheit to about 500 degrees Fahrenheit (see process block 380).

As also illustrated in FIG. 2, the invention also comprises one embodiment of sublimation transfer paper with novel coating. In that embodiment, the paper (245) has a first side and a second side. The first side of the paper has a first coating layer (255) which is formed by a first mixture (120, FIG. 1) comprised of components in which one of the components of the first mixture (120, FIG. 1) is a second mixture (110, FIG. 1). The second side of the paper (245) is comprised of a second coating layer (275), which is preferably comprised of starch. The invention further discloses that the first coating (251) and second coating (271) are added to the paper during the paper manufacturing process. Other embodiments of this sublimation transfer paper are envisioned which would include additional components on the first and/or second sides of the sublimation transfer paper.

In one embodiment, the first coating for a sublimation transfer paper is a mixture, which is referred to in this application as the first mixture (120, FIG. 1), which comprises of at least one other mixture, which is referred to in this application as the second mixture (110, FIG. 1), and at least one other component.

In a preferred and illustrative embodiment, depicted in FIG. 1, the second mixture (110) comprises of at least about 69% water (1), about 0.2% defoamer (2), about 30% polyvinyl alcohol (PVOH) (3), and about 0.06% water soluble liquid preservative (biocide) (4). Preferably, the components are added in and amounts and in the order as listed. However, the components may be added in an alternative amounts and in an alternative manner which results in the coating having the same properties sought by the invention.

As the components of the second mixture (110) are added, they are preferably mixed with a paddle (100) in an industrial mixing vessel, also referred to as a coating vessel (102), which is heated preferably with a heating jacket (103) while the components are added to the coating vessel (102). The preferred rotational speed of the paddle (100) is low shear, as determined by the mixer (104) itself. Energy may be supplied to the coating vessel (102) by an electric, gas or pneumatic motor, which is generally part of the mixer (104) itself. Any heating jacket (103) may be used which is able to increase, reduce and/or maintain the heat applied to the second mixture (110), such that the temperature of the second mixture can be substantially controlled.

Once all of the components are added to make the second mixture (110), the second mixture is heated to 190 degrees Fahrenheit by the heating jacket (103), held at that temperature for about 30 minutes, and preferably drained and filtered through cloth (112) into fifty-five gallon sanitized drums (114) so that there are no more and no less than about 30% O'Haus solids/liquid. The cloth used to filter the second mixture is preferably an approximately 55 mesh silk cloth which may be supplied, for example, by 3M (Minneapolis, Minn.). The fifty-five gallon drums (114) may be made of a variety of materials including metal, plastic or glass. A test is performed to determine the presence of O'Haus solids, which preferably includes taking a sample, conducting shear testing, and measuring the amount of solids. It is envisioned that any O'Haus solids analyzer may be utilized for this testing.

Once the second mixture (110) is filtered, it is preferably returned to the coating vessel 102 where it is cooled to about 160 degrees Fahrenheit with a heating jacket (103) and maintained at that about 160 degree Fahrenheit temperature while being continuously mixed within the coating vessel (102) using the mixer (104) at a light shear. It should be understood that another coating vessel could be used during the cooling of the second mixture (110) down to about 160 degree Fahrenheit. The second mixture (110) is preferably prepared in advance of preparing the first mixture (120).

In the same preferred and illustrative embodiment, as also depicted in FIG. 1, the first mixture (120) comprises of at least about 43.898% water (1), about 7.787% silicon dioxide (9), about 20.310% calcined or Montmorillonite clay (11), about 0.094% defoamer (2), about 10.688% acrylic polymer emulsifier (5), about 16.248% of the second mixture (110), about 0.674% alkanoamine (7), about 0.150% S-1300-C (8), about 0.112% water soluble liquid preservative (biocide) (4), and about 0.037% propylene glycol (10). Preferably, the components are added in and amounts and in the order as listed.

The components of the first mixture (120) are preferably added and mixed for the preferred amounts of time and at the appropriate conditions, where applicable. After adding the silicon dioxide (9) the resulting mixture should be mixed for about 15 to 20 minutes. Also, after adding the calcined or Montmorillonite clay (11) the resulting mixture should be mixed for about 15 to 20 minutes. Next, after the defoamer (2) and acrylic polymer emulsifier (5) are added, the resulting mixture should be mixed for about 15 minutes. Next, the second mixture (110) is added at its temperature of 160 degrees Fahrenheit and mixed for about 20 minutes. Next, a preferably alkanoamine (7) and S-1300-C (8) are added and mixed so that they are dispersed for about 20 minutes. Finally, biocide (4), and the propylene glycol (10) are added and mixed for about 20 minutes. Similar to mixing the second mixture (110), a coating vessel (102) is used to continuously mix the components of the first mixture (120) at low shear. The coating vessel (102) for the first mixture (120) does not have a heated jacket (103), and the mixture itself is not maintained at a specific temperature, or heated to a specific temperature. Preferably, the components are added in and amounts and in the order as listed; however, it is envisioned that the amounts of the components and the order of the components may be adjusted.

After the components are combined and completely mixed, the resulting first mixture (120) should preferably have a pH of 9 to 9.5, a viscosity of 2,800 to 3,100 cps at 90 degrees Fahrenheit (measured using a RVT #5 test with a speed of 20 rpms), and a O'Haus solids count of no more and no less than about 37.5% to 39% solids/liquid. Unlike the second mixture (110), the first mixture (120) does not get filtered. After the first mixture (120) (i.e. first coating) is complete, it is filled into containers, including tanks, tankers, and liquid totes, among other options, and shipped or delivered to paper mills and machines for the application of the coating to the paper during the paper manufacturing process.

The components in the first mixture (120) and second mixture (110) may be purchased from a variety of manufacturers under various trade names, where applicable; however, there is a set of preferred products and manufacturers. Preferably, the defoamer (2) used in the first mixture (120) and second mixture (110) is Knockdown Defoamer 155 which is manufactured by Knapp Products (Sanger, Calif.), or FoamKill 255 manufactured by Knapp Products (Sanger, Calif.). The defoamer (2) is used to control the amount of foam created during the mixing, blending and shear phase of the process of making mixture. The defoamer (2) selected must be able to withstand high shears. Due to its purpose, the defoamer (2) is preferably one of the first components added to the first mixture (120) or the second mixture (110).

The polyvinyl alcohol (PVOH) (3) is preferably Mowiol 4-98 which is manufactured by Kuraray Asia Pacific (Singapore) or Poval 5-98 also manufactured by Kuraray Asia Pacific. The PVOH (3) acts as a protective colloid in the polymerization of polymer emulsions. It is believed that the PVOH (3) anchors to the surface of the polymer particles that form and help stabilize the polymer emulsion during and after polymerization. It is further believed that this impact of the PVOH (3) helps maintain particle size distribution, viscosity of the coating, stability to mixing, pigment compatibility, electrolyte stability, and time for coating, among other potential benefits.

The water soluble liquid preservative (biocide) (4) used in the first mixture (120) or second mixture (110) is preferably MERGAL manufactured by Troy Corporation (based in Florham Park, N.J.). This is a biocide (4) which is used in aqueous systems where water is the primary component. Other examples of appropriate biocides include Proxel, Denzil, or Emulsogen which are each manufactured by several different companies. A biocide (4) is used in the coating to act as a preservative to ensure the coating does not get contaminated, and to facilitate faster water-based ink drying.

The silicon dioxide (9), also known as silica or silica powder, which is used in the first mixture (120) is preferably SILYSIA 350 manufactured by Fuji Silysia Chemical, Ltd., (Kasugai Aichi, Japan). The silicon dioxide (9) utilized may be in any form including precipitated silica or micronized silica. Generally, silicon dioxide (9) is used because it is a highly efficient matting agent which produced uniform coatings which reduce gloss. Silicon dioxide (9) also has anti-blocking properties, adhesion and thickening properties, and has been shown to improve inkjet ink performance.

The calcined or Montmorillonite clay (11) which is used in the first mixture (120) is preferably Kamin 2000-C manufactured by Kamin Performance Minerals (Macon, Ga.). However, various forms of clay may be used including calcined, hydrous, water washed and delaminated clay. The calcined or Montmorillonite clay (11) incorporates readily into water-based coatings and imparts sheen control, titanium oxide extension, tint strength, and brightness.

The acrylic polymer emulsifier (5) which is used in the first mixture (120) is preferably Hycar 26391 manufactured by The Lubrizol Corporation (Wickliffe, Ohio). Generally, acrylic polymer emulsifiers are used in coatings for paper because they have resistance to discoloration, they are high gloss, and are good for pigment binding.

The organic high performance alkanoamine (7) which is used in the first mixture (120) is preferably AMP-95 manufactured by Nexeo Solutions (The Woodlands, Tex.). It used a co-dispersant for particulates, and to adjust and control the pH in the coating solution. It also helps with bio-stability.

The S-1300-C (8) which is used in the first mixture (120) is preferably manufactured by Synthetic Natural Polymers (Durham, N.C.). It is used as a thickener and to adjust the solids in the coating solution.

The propylene glycol (10) which is used in the first mixture (120) is preferably manufactured by Eastman Chemical (Kingsport, Tenn.). The propylene glycol (10) is used as a binder in the coating.

Figure 4:
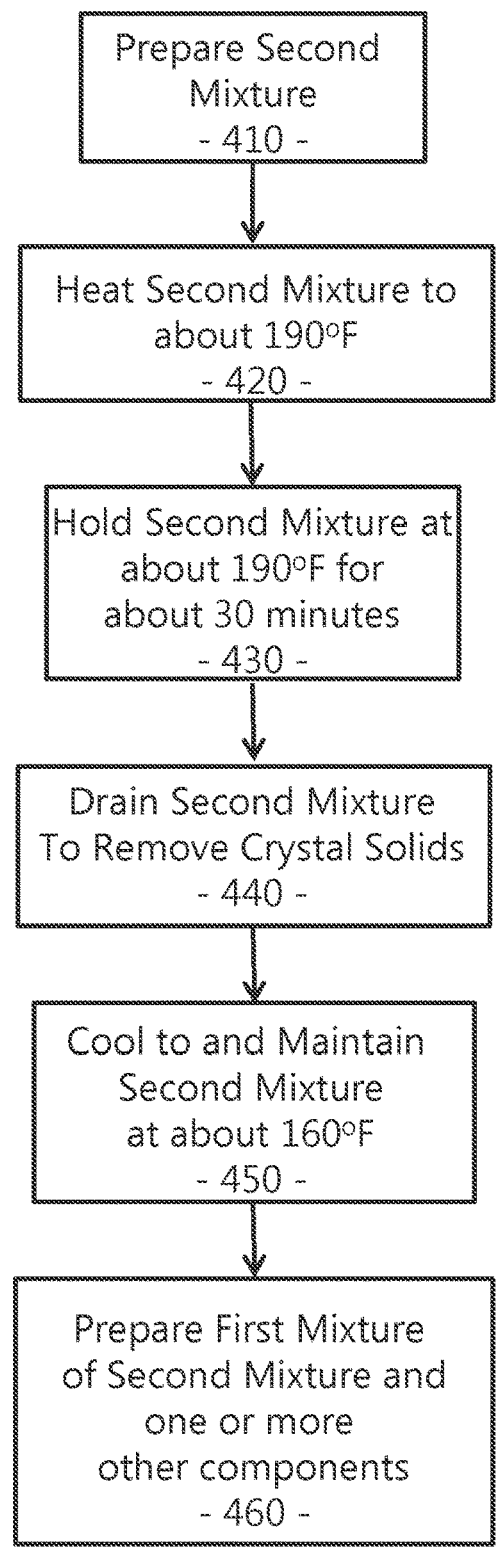
FIG. 4 of the drawings is a flow diagram of a novel process for making coating for sublimation transfer paper.

As illustrated in FIGS. 2 and 4, together, a method of producing the sublimation transfer paper coating is also disclosed. First, the second mixture (110) is prepared which has at least one component (see, process block 410). Next, second mixture (110) is heated to a temperature of about 190 degrees Fahrenheit (see, process block 420). Next, the second mixture (110) is held at a temperature of about 190 degrees Fahrenheit for about 30 minutes (see, process block 430). Next, the second mixture (110) is drained to remove crystal solids (see, process block 440). Next, the second mixture (110) is cooled to a temperature of about 160 degrees Fahrenheit, and maintained at that temperature (see, process block 450). Lastly, a first mixture (120) is prepared by combining the second mixture (110) with one or more components (see, process block 460). While this illustration is limited to one embodiment of the coating, other embodiments of making the coating would include coatings incorporating modified components, amounts of components, mixing times, temperatures, among other adjustable factors.

We claim:

1. A method for making a sublimation transfer paper coating comprising:
   preparing a base mixture comprising base mixture components water, defoamer, polyvinyl alcohol, and biocide,
   heating the base mixture to a temperature of about 190 degrees Fahrenheit,
   holding the base mixture at a temperature of about 190 degrees Fahrenheit for about 30 minutes,
   draining the base mixture to remove crystal solids,
   cooling the base mixture to temperature of about 160 degrees Fahrenheit, maintaining the temperature of the base mixture at a temperature of about 160 degrees Fahrenheit, and
   preparing a coating mixture by combining coating mixture components wherein one of the coating mixture components is the base mixture having a temperature of about 160 degrees Fahrenheit, and wherein the other coating mixture components comprise water, silicon dioxide, calcined or Montmorillonite clay, defoamer, acrylic polymer emulsifier, alkanoamine, sodium alginate, biocide, and propylene glycol.

2. The method of claim 1, wherein preparing the base mixture comprises combining the base mixture components in the percentages of about 69% water, about 0.2% defoamer, about 30% polybvinyl alcohol, and about 0.06% biocide.

3. The method of claim 2, wherein preparing the base mixture further comprises combining the base mixture components in the order of water, defoamer, polyvinyl alcohol, and biocide.

4. The method of claim 1, wherein the heating of the base mixture begins while preparing the base mixture.

5. The method of claim 1 further comprising the step of mixing the base mixture at a low shear while preparing the base mixture and during the addition of the base mixture components water, defoamer, polyvinyl alcohol, and biocide.

6. The method of claim 1, further comprising the step of mixing the base mixture while maintaining the temperature at 160 degrees Fahrenheit.

7. The method of claim 1, wherein preparing the coating mixture comprises combining the coating mixture components in an order and in a percentage of about 43.898% water, about 7.787% silicon dioxide, about 20.310% calcined or Montmorillonite clay, about 0.094% defoamer, about 10.688% acrylic polymer emulsifier, about 16.248% of the base mixture, about 0.674% alkanoamine, about 0.150% sodium alginate, about 0.112% biocide, and about 0.037% propylene glycol.

8. A coating for sublimation transfer paper comprising: a coating mixture containing coating mixture components, wherein one of the coating mixture components is a base mixture comprising base mixture components water, defoamer, polyvinyl alcohol, and biocide, and wherein the other coating mixture components comprise water, silicon dioxide, calcined or Montmorillonite clay, defoamer, acrylic polymer emulsifier, alkanoamine, sodium alginate, biocide, and propylene glycol, and wherein the base mixture is combined with the other coating mixture components at a temperature of about 160 degrees Fahrenheit.

* * * * *